United States Patent
Lei

(10) Patent No.: US 9,307,390 B2
(45) Date of Patent: Apr. 5, 2016

(54) GROUP BASED MOBILITY OPTIMIZATION METHOD AND DEVICE IN MACHINE-TYPE COMMUNICATION

(75) Inventor: Zhengxiong Lei, Shanghai (CN)

(73) Assignee: GEMALTO SA, Meudon (FR)

( * ) Notice: Subject to any disclaimer, the term of this patent is extended or adjusted under 35 U.S.C. 154(b) by 218 days.

(21) Appl. No.: 13/520,839

(22) PCT Filed: Jan. 8, 2010

(86) PCT No.: PCT/CN2010/070081
§ 371 (c)(1),
(2), (4) Date: Jul. 6, 2012

(87) PCT Pub. No.: WO2011/082538
PCT Pub. Date: Jul. 14, 2011

(65) Prior Publication Data
US 2013/0021970 A1    Jan. 24, 2013

(51) Int. Cl.
*H04W 8/06* (2009.01)
*H04W 4/00* (2009.01)
(Continued)

(52) U.S. Cl.
CPC ............... *H04W 8/06* (2013.01); *H04W 4/005* (2013.01); *H04W 4/08* (2013.01); *H04W 36/0027* (2013.01); *H04W 60/00* (2013.01)

(58) Field of Classification Search
CPC ..... H04W 8/085; H04W 8/087; H04W 64/00; H04W 88/005; H04W 68/00; H04W 68/02; H04W 36/00; H04W 60/00
USPC .......................................... 370/328, 329, 331
See application file for complete search history.

(56) References Cited

U.S. PATENT DOCUMENTS 8,238,909 B2 * 8/2012 Guo et al. ................... 455/435.1
8,369,876 B2 * 2/2013 Bachmann et al. ........ 455/456.5
(Continued)

FOREIGN PATENT DOCUMENTS

CN    101399750 A    4/2009
CN    101400160 A    4/2009
(Continued)

OTHER PUBLICATIONS

3GPP TS 22.368 V1.1.1 (Nov. 2009), 3rd Generation Partnership Project; Technical Specification Group Services and System Aspects; Service requirements for machine-type communications; stage 1 (Release 10), p. 1-17.*

(Continued)

*Primary Examiner* — Joseph Bednash
(74) *Attorney, Agent, or Firm* — Fay Sharpe LLP

(57) ABSTRACT

The present invention relates to a method and device of performing Tracking Area Update TAU for a group of Machine-Type Communication MTC devices in a communication network. According to an embodiment of the present invention, the group comprises a first MTC device and at least one second MTC device that have the same group ID and location information, the communication network comprises an old Mobility Management Entity MME and a new Mobility Management Entity MME before and after TAU, respectively, for providing mobility management to the group of MTC devices, and the method comprises: after the new MME receives a TAU request about the first MTC device, obtaining a context of the first MTC device from the old MME; the new MME checking the context of the first MTC device to find the group ID of the group; and if the group ID is included in the context of the first MTC device, the new MME utilizing the group ID to obtain from the old MME a context of the at least one second MTC device.

10 Claims, 5 Drawing Sheets

(51) Int. Cl.
*H04W 4/08* (2009.01)
*H04W 36/00* (2009.01)
*H04W 60/00* (2009.01)

(56) References Cited

U.S. PATENT DOCUMENTS

| | | | |
|---|---|---|---|
| 8,811,984 B2* | 8/2014 | Cho et al. | 455/434 |
| 2009/0271623 A1 | 10/2009 | Forsberg et al. | |
| 2010/0056175 A1* | 3/2010 | Bachmann et al. | 455/456.1 |
| 2010/0267388 A1* | 10/2010 | Olsson | 455/436 |
| 2012/0287854 A1* | 11/2012 | Xie et al. | 370/328 |
| 2013/0070775 A1* | 3/2013 | Qu | 370/401 |

FOREIGN PATENT DOCUMENTS

| | | | | |
|---|---|---|---|---|
| CN | 101521871 A | | 9/2009 | |
| JP | 2009-538583 | | 11/2009 | |
| WO | WO 2009/015595 | * | 2/2009 | ........ H04Q 7/20 |
| WO | WO2009/044222 A1 | | 4/2009 | |
| WO | WO2009/045007 A1 | | 4/2009 | |

OTHER PUBLICATIONS

3GPP TS 23.401 V9.2.0 (Sep. 2009) 3rd Generation Partnership Project; Technical Specification Group Services and System Aspects; General Packet Radio Service (GPRS) enhancements for Evolved Universal Terrestrial Radio Access Network (E-UTRAN) access (Release 9), pp. 70-74.*

International Search Report for PCT/CN2010/070081 dated Oct. 21, 2010.

Notice of Preliminary Rejection for corresponding Korean Application No. 10-2012-7020588, dated Jul. 7, 2014, 8 pages.

Panasonic, "Group-based mobility improvement for MTC," 3GPP TSG SA WG2 Meeting #76, TD S2-096874, Nov. 16-20, 2009, San Jose Del Cabo, Mexico, Document for: Approval, Agenda Item: 9.7, Work Item / Release: NIMTC/ Rel-10, 2 pages.

Alcatel-Lucent Shanghai Bell, Alcatel-Lucent, "Network improvement for group based mobility," 3GPP TSG SA WG2 Meeting #77, TD S2-100410, Jan. 18-22, 2010, Shenzhen, China, Document for: Approval, Agenda Item: 9.7, Work Item / Release: Rel-10, 3 pages.

* cited by examiner

GROUP BASED MOBILITY OPTIMIZATION METHOD AND DEVICE IN MACHINE-TYPE COMMUNICATION

FIELD OF THE PRESENT INVENTION

The present invention relates to a communication network, and more specifically, to a mobility optimization mechanism for a Machine-Type Communication device in the communication network.

BACKGROUND OF THE PRESENT INVENTION

MTC (Machine-Type Communication, also commonly known as M2M or Machine to Machine communication) concerns data communications between machines that do not need human interaction. MTC will become the next trillion-dollars-level communication market. Currently 3GPP SA1 has set up a work item and is working on the specification TS 22.368 (Service Requirements for Machine-Type Communications; Stage 1). Recently 3GPP SA2 has also set up a study item (Network Improvements for Machine-Type Communications) to study MTC.

MTC is different to existing mobile network communication services, so the current telecommunication network is required to be enhanced to adapt for MTC. TS 22.368 defines many MTC features, among which Group Based MTC Features are an important type of MTC features.

TR 23.888 also defines Group Based Optimization as a key issue for network improvement for MTC. Group based optimization may include optimizations in many aspects, e.g. group based billing optimization, group based signaling saving, etc. Among them, group based mobility is an important optimization. One example of such a group is typically a number of MTC devices in a vehicle (e.g. a car), belonging to a single MTC user and used by different applications such as driver security, navigation, car diagnostics, etc. However, since these MTC devices may be used by different applications, they may be connected to different MTC Servers and thus work independently of each other. Since these MTC devices are adherent to the same vehicle, they will have the same movement pattern and hence, they will be within reach of the same eNB (Evolved Node B) and in the same cell at the same time. This common movement behavior will result in a surge of mobility management signaling, increase in network load, power consumption in the MTC devices, etc. In order to overcome these adverse effects, some improvements to the network or system are required.

A potential improvement is to allow group based mobility management signaling saving for such group of MTC devices. However, there are no existing solutions for this problem till now. TR 23.888 only describes the group based optimization issue, but does not present the solutions for the issue. And all the SA2 contributions for this TR have not proposed any solutions.

In this paper, the inventor proposes a mechanism for solving group based mobility optimization issue in Machine-Type Communications, to overcome the problem existing in the prior art.

SUMMARY OF THE PRESENT INVENTION

According to an embodiment of the present invention, there is provided a method of performing Tracking Area Update TAU for a group of Machine-Type Communication MTC devices in a communication network, the group comprising a first MTC device and at least one second MTC device that have the same group ID and location information, the communication network comprising an old Mobility Management Entity MME and a new Mobility Management Entity MME before and after TAU, respectively, for providing mobility management to the group of MTC devices, the method comprising:

a. after the new MME receives a TAU request about the first MTC device, obtaining a context of the first MTC device from the old MME;

b. the new MME checking the context of the first MTC device to find the group ID of the group; and c. if the group ID is included in the context of the first MTC device, the new MME utilizing the group ID to obtain from the old MME a context of the at least one second MTC device.

According to an embodiment of the present invention, step b further includes: when the new MME receives other TAU request with the same location information sent by the at least one second MTC device, suspending the handling of the other TAU request.

According to an embodiment of the present invention, step c further includes:

c1. if the group IF) is included in the context of the first MTC device, the new MME utilizing the group ID to query fir information of the first MTC device and the at least one second MTC device included in the group;

c2. the new MME sending to the old RIME a Context Request message including the group ID;

According to an embodiment of the present invention, step c further includes:

c3. the old MME utilizing the group m to query for information of the first MTC device and the at least one second MTC device included in the group; and c4. the old MME providing the context of the at least one second MTC device to the new MME according to information of the at least one second MTC device.

In an embodiment according to the present invention, the method further includes: after obtaining the context of the at least one second MTC device from the old MME, the new MME sending to the old MME a Context Acknowledge including the group ID to acknowledge the receipt of the context of the first MTC device and of the context of the at least one second MTC device.

In a preferred embodiment of the present invention, the communication network further includes an old Serving GateWay SGW which serves the group of MTC devices before the occurrence of the TAU procedure, and the method further includes: the old MME sending to the SGW a Delete Session Request including the group ID, and after the SGW queries for information of the first MTC device and the at least one second MTC device included in the group, sending to the old MME a Delete Session Response including the group ID.

Preferably, when an MTC device is attached to the communication network, the old MME device adds, when creating a context for the MTC device, the group ID in the context.

In another aspect, the present invention also provides a Mobility Management Entity MME of performing mobility management for a group of Machine-Type Communication MTC devices in a communication network, the group comprising a first MTC device and at least one second MTC device that have the same group ID and location information, the communication network comprising an old MME for providing mobility management to the group of MTC devices before the execution of the TAU procedure, the MME comprising:

context of the first MTC device obtaining module for, after receiving a TAU request about the first MTC device, obtaining a context of the first MTC device from the old MME;

checking module for checking the context he first MTC device find the group ID of the group; and context of the second. MTC device obtaining module for utilizing the group ID to obtain from the old MME a context of the at least one second MTC device.

In an embodiment according to the present invention, the MME further includes: suspending module for, when receiving other TAU request with the same location information sent by the at least one second MTC device, suspending the handling of the other TAU request.

According to the embodiment of the present invention, the context of he second MTC device obtaining module further includes:

query module for, if the group ID is included in the context of the first MTC device, utilizing the group ID to query for information of the first MTC device and the at least one second MTC device included in the group;

context request module for sending to the old MME a Context Request message including the group ID; and context reception module for receiving the context of the at least one second MTC device provided by the old MME.

Preferably, the MME according to an embodiment of the present invention further includes: context acknowledge module for, after obtaining the context of the at least one second MTC device from the old MME, sending to the old MME a Context Acknowledge including the group ID to acknowledge the receipt of the context of the first MTC device and of the context of the at least one second MTC device.

In yet another aspect, the present invention also provides an MTC Mobility Group Server for a communication network, the server including storage device and query device, the storage device storing, for a group including a plurality of MTC devices, an association between a group ID of the group and identities of the MTC devices in the group, wherein when an MTC device in the group is attached to or detached from the communication network, the identity of the MTC device is added into or removed from the group, the server also including query device, which is configured to, when the server receives Get Group Member Information Request, provide the identities of the MTC devices included in the group.

BRIEF DESCRIPTION OF THE DRAWINGS

Other objects and advantages of the present invention will become more clear and easy to understand with reference to the following description in conjunction with the drawings, in which.

DETAILED DESCRIPTION OF THE PRESENT INVENTION

Figure 1:
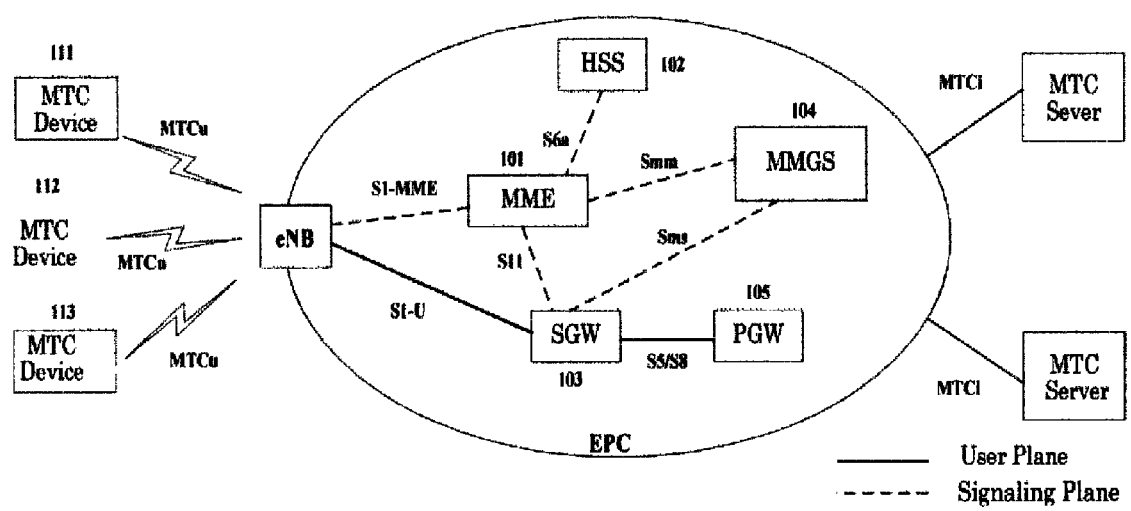
FIG. 1 shows a network structure according to an embodiment of the present invention.

FIG. 1 shows a network structure according to an embodiment of the present invention. In FIG. 1, Mobility Management Entity MME 101, Home Subscriber Server HSS 102, Serving GateWay SGW 103, and PDN GateWay PGN 105 and the like are shown in Evolved Packet Core network EPC. Of course, the EPC may also include other different network elements, while FIG. 1 shows only parts related with the present invention. Machine-Type Communication (MTC) devices 111, 112, 113 are attached to the core network EPC via eNBs. For simplicity, conventional functions and structures of these network elements are no more concerned herein. It should be noted that although FIG. 1 shows only three MTC devices for illustrative purpose, in practice, it is very likely there are far more than three, perhaps up to dozens of or even more than a hundred MTC devices. These MTC devices are for example located in a same vehicle or in any other possible same area, and they have the same location information and are connected to a same eNB.

In a network structure according to the present invention, a new network element 104, i.e., MTC Mobility Group Server (hereinafter called as MMGS), is provided. The MMGS stores the relationship of each group and its active/attached members. In the example shown in FIG. 1, group members are MTC devices 111-11:3. According to the embodiment of the present invention, the MMGS typically consists of storage device and query device. For example, for each group of MTC devices, the MMGS server may keep and maintain one table, which consists of at least one group ID, and identities (or identifications) (e.g. GUTI (Global Unique Temporary Identifier) and IMSI (International Mobile Subscriber Identification Number), etc.) of all the active/attached members belonging to the group. In the HSS 102, a group ID and group based mobility optimization flag are included in each MTC device's subscription data. If an MTC device is included in a group and group based mobility optimization is required to be used for the group, the HSS will include a group ID and set a group based mobility optimization flag in the MTC device's subscription data. The same group of MTC devices has the same group ID and group based mobility optimization flag.

When an MTC is attached to the network, the MME 101 should update the MMGS 104, i.e., add this MTC device to the group. When the MTC device is detached from the network, the MME should also update the MMGS, i.e., delete the identity of the MTC device from the group. Therefore, member information of MTC devices belonging to some group included in the storage device is dynamic.

In the network structure shown in this figure, there are also shown two interfaces, i.e., an interface Smm between the MMGS 104 and the MME 101 and an interface Sms between the MMGS 104 and the SGW 103. These two interfaces may be used to query for and update group information. For example, with the help of these two interfaces, the MME 101 and the SGW 103 may get from the MMGS 104 information of active/attached MTC devices in any group.

In a Tracking Area Update (TAU) procedure according to the present invention, when a context of a MTC device stored in the MME indicates that group based mobility optimization for this MTC device has been activated, the MME 101 and the SGW 103 can group some signaling messages in the TAU procedure for active/attached MTC devices in the same group.

The present invention also provides an interface S10 (not shown in FIG. 1) between an old MME device (not shown in FIG. 1) and a new MME 101, to which the MTC device is attached before and after the occurrence of tracking area update, and an interface S11 between the MME 101 and the SGW 103, and these two interfaces are used to group a plurality of signaling messages into one message.

Functions of the above network elements and interfaces will be further described in conjunction with specific workflows.

Figure 2:
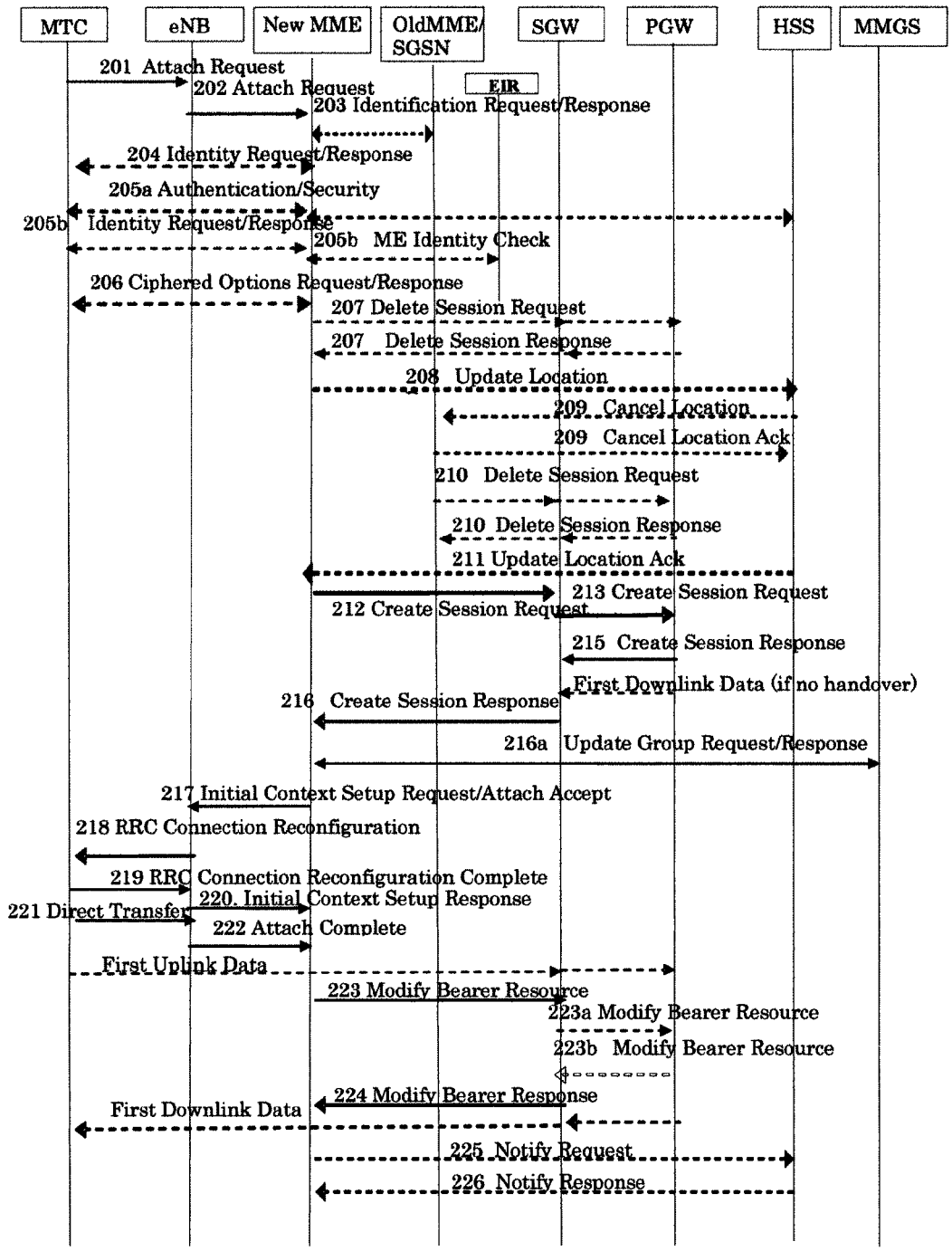
FIG. 2 shows an attach procedure for a group based mobility optimization mechanism according to the embodiment of the present invention.

FIG. 2 shows an attach procedure for a group based mobility optimization mechanism according to the embodiment of the present invention. According to the embodiment of the present invention, if the subscription data of an MTC device in the HSS indicates that the MTC device belongs to some group and a group based mobility optimization flag is set, and when the MTC device is successfully attached to the EPC, the MME should update the MMGS with group ID and MTC device's identity (e.g., IMSI and GUTI, etc.), and the MMGS should add the MTC device's identity into the group.

The attach procedure shown in this figure an improvement on the basis of 3GPP TS23.401. When some MTC device sends out "Attach Request" in step 201, an eNB node forwards the request to a new MME, and the new MME together with the old MME, Serving GateWay SGW, HSS and the like performs a series of authentication, security and location update operations. Different than the attach procedure in 3GPP TS23.401, in step 211, the new MME receives "Update Location Acknowledge" from the HSS, and this message contains the MTC device's IMSI number and subscription data. If all checks are successful then the new MME will construct a context for the MTC device. When constructing the context, the MME will check the MTC device's subscription data. If the MME finds that a group ID and group based mobility optimization flag are set in the MTC device's subscription data, the MME will include the group ID and the group based mobility optimization flag in the MTC device's context.

In addition, after a session is successfully created in step 216, the new MME checks the MTC device's context. If the MME finds there are the group ID and the group based mobility optimization flag in the MTC device's context, it will send Update Group Request in step 216a, which contains the attached MTC devices' group ID and this MTC device's identity (e.g. IMSI and GUTI, etc). On receiving the Update Group Request, the MMGS will store the relationship between the group ID and this MTC device's identity. In other words, the MMGS will add this MTC device's identity into the group.

Figure 3:
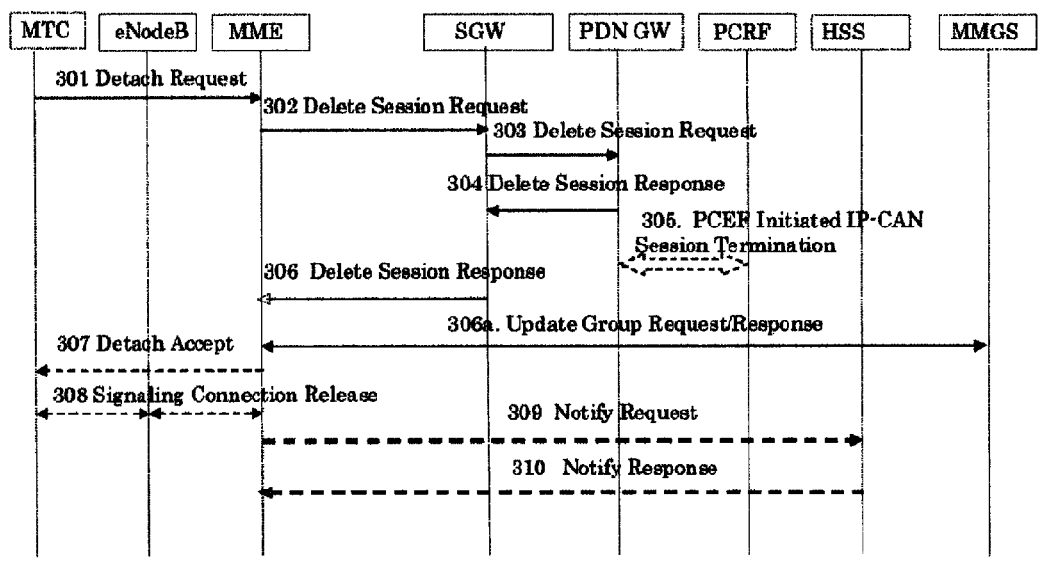
FIG. 3 shows a detach procedure for the group based mobility optimization mechanism according to the embodiment of the present invention.

FIG. 3 shows a detach procedure for the group based mobility optimization mechanism according to the embodiment of the present invention.

According to the embodiment of the present invention, when an MTC device is detached from the EPC, the MME should update the MMGS to remove this MTC device's identity from the group.

In the specification TS 23.401, there are 4 types of detach procedures: UE (or MTC device)-Initiated Detach Procedure; MME-Initiated Detach Procedure; SGSN-Initiated Detach procedure; and HSS-Initiated Detach Procedure. Since the sub-procedure for group based mobility optimization is the same for different types of detach procedures, only the MTC-device-initiated detach procedure will be illustrated here.

As shown in FIG. 3, in step 301, an MTC device sends Detach Request to the MME device. The MME sends Delete Session Request to the SGW and in steps 303 and 304, the handling procedure for session deletion is performed between the SGW and the PDN GW. Different than the specification 3GPP TS 23.401, when the session was successfully deleted in step 316, the MME will check the MTC device's context. If the MME finds there are the group ID and the group based mobility optimization flag in the MTC device's context, the MME will send Update Group Request with the group ID and the MTC device's identity (e.g., IMSI and GUTI, etc.). On receiving the Update Group Request, the MMGS will remove the MTC device's identity from the group.

Figure 4:
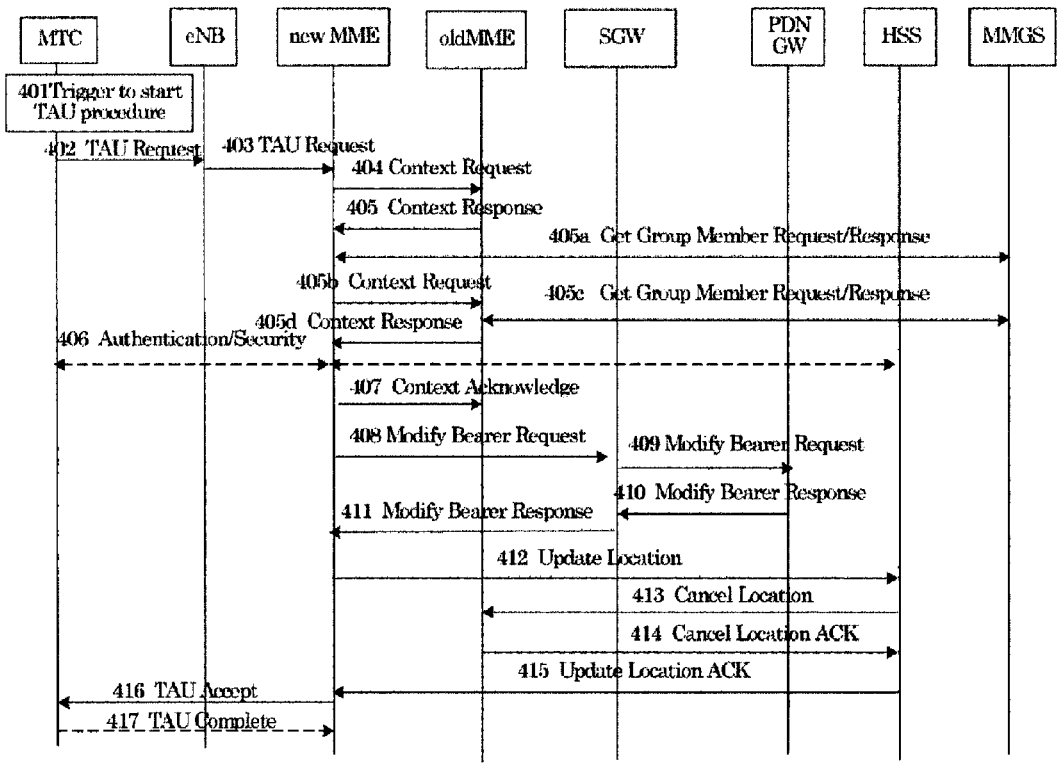
FIG. 4 shows a TAU procedure according to the embodiment of the present invention.

FIG. 4 shows a TAU procedure according to the embodiment of the present invention.

According to the embodiment of the present invention, when one MTC device in the group triggers a TAU procedure, if the context of this MTC device in the MME indicates that group based mobility optimization is required, Context Request message and Context Acknowledge message between the new MME and the old MME for this MTC device may be grouped to save the signaling handling cost.

In the flow described in FIG. 4, the TAU procedure does not involve a change of the Serving GateWay SGW, and the TAU procedure is an improvement on the basis of the EPS TAU procedure (as defined in Section 5.3.3.2 in 3GPP TS 23.401v9.2.0).

As mentioned herein above, since the MTC devices in the group are often at the same area and have the same movement pattern, they will be served by the same MME and Serving GateWay/PDN Gateway at the same time. Therefore, signaling messages between these network elements could be grouped to save resources. As FIG. 4 shows, when the MME finds that group based mobility optimization is required to be activated, the MME will group a plurality of signaling of a plurality of devices in the group in the TAU procedure for unified handling. The parts different than 3GPP TS 23.401 will be focused below.

In steps 401 to 403 similar to those in 3GPP TS 23.401, when one MTC device triggers a TAU procedure, the MTC device will initiate the TAU procedure by sending a TAU request to the new MME.

In this embodiment, it is assumed that the MTC device 111 is a member in the group and group based mobility optimization has been applied to the group.

In step 404, on receiving the TAU request from the MTC device 111, the new MME will send "Context Request" to the old MME, to obtain context information of the MTC device 111 from the old MME. In step 405, the old MME responds the new MME with context information of the MTC device 111. These two steps are the same as the corresponding steps in 3GPP TS 23.401.

The difference is that after receiving the context of the MTC device 111, the new MME will check and store the context of the MTC device 111. If the new MME finds that the group ID and group based mobility optimization flag are included in the context, it will send to the MMGS "Get Group Member Information Request" with group ID in step 405a. After receiving this request, the MMGS will send to the new MME "Get Group Member Information Response" with the group members' information (including IMSI, GUTI, etc of each MTC device in the group). The new MME will store group member information and use it to replace any existing group member information of this group.

It is noteworthy that, as a preferred embodiment, a group based mobility optimization flag is included in the context of the MTC device, so that the MME may determine according to the flag that the corresponding device has subscribed group based mobility optimization. However, the group based mobility optimization flag included in the MTC device's context is not necessary, and other means can also be used to notify that the MME corresponding terminal device has subscribed group based mobility optimization.

On the other hand, the new MME will store location information of the group (for example, "last visited TAI"). Any other TAU request with the same location information, from any other MTC device in the group, will be pending at the new MME and not be handled until step 416. It will be mentioned below that in step 416, the new MME will send responses to the other TAU requests (received from other MTC devices in the group). The construction of these responses is based en the information of the other MTC devices 112, 113 gotten from steps 404 to 115.

Taking into account a very special case where prior to the completion of the step (i.e., step 405a) in which the new MME queries and obtains Group Member Information, there may be other TAU requests sent by other MTC devices (e.g., the MTC device 112) arriving at the new MME and therefore there will be new Context Request messages being sent from the new MME to the old MME, in this case, because the old MME finds there are the mobility optimization flag and the group ID same as the MTC device 111 in the context of the MTC device 112, the old MME may not handle but directly discard the Context Request of the MTC device 112.

In step 405b, different than the normal EPS TAU procedure, the new MME utilizes the group ID to send to the old MME a "Context Request" message, which shall include the group ID and the group based mobility optimization flag and indicates that the new MME desires to obtain from the old MME contexts of all the members (active/activated MTC devices) under the same group ID. It is noteworthy that, in this step, the new MME utilizes the group ID to request a group of MTC devices for context information, rather than one by one for different MTC devices.

In step 405c, after receiving the Context Request including the group ID and group based mobility optimization flag sent by the new MME, the old MME queries the MMGS for group member information. After receiving the request for querying for group member information sent by the old MME, the MMGS will send to the old MME a response with the group members' information (including IMSI, GUTI, etc of each MTC device in the group). The old MME will store group member information and use it to replace any existing group member information in the group.

In the next step 405d, for other MTC devices in the group (e.g., MTCs 112 and 113), the old MME responds the new MME with a "Context Response" message. And the new MME will set up a context for each MTC device in the group.

Step 406 is the same as the corresponding step in the normal EPS TAU.

In step 407, after the new MME has received the context message of each MTC device in the group, the MME will send a "Context Acknowledge" message to the old MME. The acknowledge message includes the group ID. It is noteworthy that only after having received the context message of each of all the MTC devices in the group, the new MN/1E sends to the old MME a "Context Acknowledge" message with the group ID, rather than as in the normal EPS TAU procedure in which one Context Acknowledge is sent for each context response.

Steps 408 to 415 are the same as the corresponding steps in the EPS TAU procedure. The new MME will trigger the execution of steps 108 to 415 for each MTC device in the group. In steps 408 to 411, the new MME, the SGW and the PDN GW modify bearers for each MTC device. In steps 412 to 415, MME information is updated for each MTC devices on the HSS.

In addition, it should be noted that in steps 405a, 405c shown in FIG. 4, the new MME and the old MME query a new network element MMGS for group member information and for those skilled in the art, the MMGS may not be necessary. According to the basic idea of the present invention, any other network element or functional module capable of storing, updating group member information and providing the group member information in real time can independently or by combination implement the functionality of the MMGS. Therefore, the MMGS may be centralized, and may also be distributed.

Figure 5:
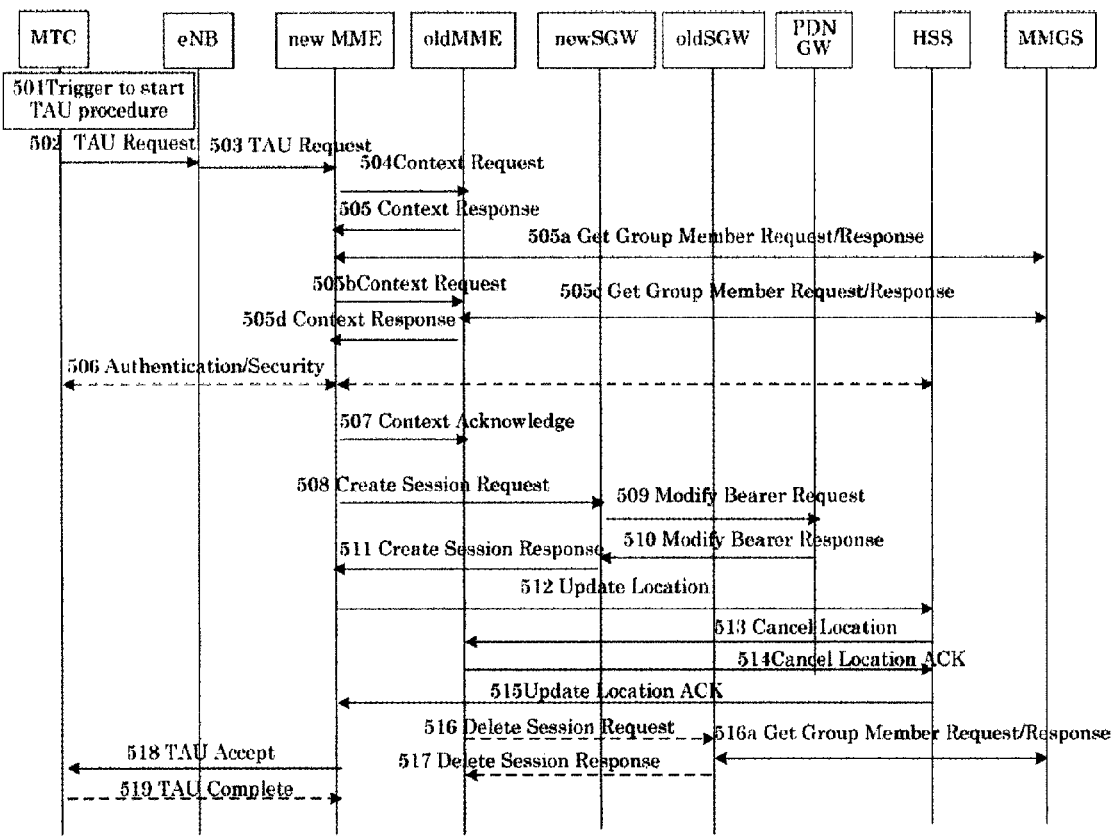
FIG. 5 shows a TAU procedure according to another embodiment of the present invention.

FIG. 5 shows a TAU procedure according to another embodiment of the p sent invention.

As mentioned herein above, since the MTC devices in this type of group are often at the same area and have the same movement pattern, they will be served by the same MME and Serving GateWay/PDN Gateway at the same time. Therefore, signaling messages between these network elements (MME, SGW and PGW) could be grouped to save resources.

The TAU procedure shown in FIG. 5 is an improvement on the basis of the existing EPS TAU procedure (see Section 5.3.3.1 in 3GPP TS 23.401 v9.2.0).

In this embodiment, same as the description with reference to FIG. 4, if the context of the MTC device 111 in the MME indicates that group based mobility optimization is required, Context Request messages and Context Acknowledge messages between the new MME and the old MME for all the attached MTC devices may be grouped to save the signaling handling cost. The embodiment shown in FIG. 5 takes into account the case where the TAU procedure involves the change of the SGW. For the purpose of saving resources, it may be taken into account on the basis of grouping signaling messages between the old MME and the new MME that Delete Session Request/Response messages between the old MME and the old Serving Gateway SGW for all the attached MTC devices in the group could be grouped.

As shown in FIG. 5, by means of the network elements MMGS and MME/SGW as well as interfaces therebetween, when the MME and the SGW find group based mobility optimization is required or activated, the MME and the SGW may group in the TAU procedure some signaling for several attached devices of the same group. The parts different than 3GPP TS 23.401 will be focused below.

In FIG. 5, steps 501 to 506 are similar to steps 401 to 406 in FIG. 4, steps 505a, 505b, 505c, 505d are the same as steps 405a, 405b, 405c, 405d, and no more description will be given here.

In step 507, only after having received the context for each of all the MTC devices in the group, the new MME sends to the old MME "Context Acknowledge" with the group ID.

In step 507 of the present embodiment, the Context Acknowledge received by the old MME from the new MME includes "Serving Gateway Change Indication", which means in the TAU procedure, the SGW serving the group will change. Therefore, in steps 508 to 510, the new MME needs to allocate resources for all the MTC devices sending out TAU on a new SGW. In steps 512 to 515, the new MME updates MME information for each MTC device on the HSS.

According to the embodiment of the present invention, we can take account of grouping a plurality of signaling messages in steps 516 and 517 and adding step 516a. According to a preferred embodiment of the present invention, in step 516, if the old MME receives the SGW change indication in the Context Acknowledge message, the old MME deletes the EPS bearer resource by sending to the old SGW a "Delete Session Request" message, which includes Delete Cause, group ID, group based mobility optimization flag, etc.

In step 516a, on receiving the "Delete Session Request", the old SGW checks if the group ID and the group based mobility optimization flag exist. If yes, the old SGW sends to the MMGS Get Group Member Information Request with group ID. After receiving this request, the MMGS will send to the old SGW "Get Group Member Information Response" with the group members' information (including IMSI, GUTI, etc of each MTC device in the group).

In subsequent step 517, the old SGW gets the TEID of each MTC device in the group from the context of each MTC device and releases SI-U bearer resource for each MTC device. And then the old SGW sends to the old MME Delete Session Response with group ID.

Different than 3GPP TS 23.401, in step 516, the old MME does not need to send Delete Session Request for each MTC device, but only uses a Delete Session Command that contains the group ID to request the old SGW to delete bearer resources of all MTC devices with the same group ID. Also, in step 517, the old SGW can use only one response message that contains the group ID to respond the Session. Delete Request. Thus, signaling messages between the old MME and the old SGW are greatly reduced.

The subsequent step 418 is the same as the corresponding step in the normal EPS TAU procedure, and for each MTC device in the group, the new MME sends a TAU Accept message: for each MTC device in the group, after receiving a TAU request from an MTC device and having received "Update Location Acknowledge" for this MTC device in step 15, the new MME sends a "TAU Accept" message. In step 419 as in the normal EPS TAU procedure, each MTC device acknowledges the new MME.

It should be noted that in the embodiment described with reference to FIG. 5, the group based mobility optimization flag included in the context of the MTC device is not necessary, and other means may be used to notify that the MME corresponding terminal device has subscribed group based mobility optimization. Moreover, the group based optimization mechanism is not limited to group based mobility optimization, but may also include group based billing optimization, etc. Those skilled in the art may contemplate, taught by the basic idea of the present invention, other different implementations.

According to the embodiment of the present invention, the implementation of relevant network elements such as the MME, the SGW, etc., is not very difficult to those skilled in the art, and can be achieved by computer software modules based on existing network element hardware, software facilities. For example, corresponding to the embodiment of the method of the present invention, the MME according to the embodiment of the present invention may include some of the following modules: a) context of the first MTC device obtaining module for obtaining, after receiving for example a TAU request from the MTC device 111, the context of the MTC device 111 from the old MME; b) checking module for checking the context of the MTC 111 to find the group ID of the group; and c) context of the second MTC device obtaining module for utilizing the group ID to obtain the contexts of the MTCs 112 and MTC 113 (other MTC devices in the group) from the old MME. Wherein, the module for obtaining from the old MME the context of the at least one second MTC device (we may call it as module c) may further include: a query module for, if the group ID is included in the context of the MTC device 111, utilizing the group ID to query for information of all the members (i.e., MTC devices 111-113) included in the group; a context request module for sending to the old MME a Context Request message including the group ID; and a context reception module for receiving contexts of other MTC devices provided by the old MME besides the MTC device 111. Additionally, according to the embodiment of the present invention, preferably, the MME also includes: context acknowledge module for, after obtaining the contexts of all the members in the group from the old MME, sending to the old MME Context Acknowledge including the group ID, to acknowledge the receipt of the contexts of all the members (including the MTC device 111 and MTCs 112, 113).

Although the present invention is described in conjunction with the embodiments, the present invention is not limited to any embodiment. The scope of the present invention is defined by the claims, and includes a variety of options, modifications, and equivalent substitutions. Therefore, the scope of protection of the present invention should be determined by the contents of the attached claims.

The invention claimed is:

1. A method of performing Tracking Area Update (TAU) for a group of Machine-Type Communication (MTC) devices in a communication network, the group comprising a first MTC device and at least one second MTC device that have the same group ID and location information, the communication network comprising an old Mobility Management Entity (MME) and a new Mobility Management Entity (MME) before and after TAU, respectively, for providing mobility management to the group of MTC devices, the method comprising:
   a. after the new MME receives a TAU request about the first MTC device, obtaining a context of the first MTC device from the old MME;
   b. the new MME checking the context of the first MTC device to find the group ID of the group, and when the new MME receives other TAU request with the same location information sent by the at least one second MTC device, suspending the handling of the other TAU request; and
   c. if the group ID is included in the context of the first MTC device, the new MME utilizing the group ID to obtain from the old MME a context of the at least one second MTC device.

2. The method according to claim 1, wherein, the step c further includes:
   c1. if the group ID is included in the context of the first MTC device, the new MME utilizing the group ID to query for information of the first MTC device and the at least one second MTC device included in the group;
   c2. the new MME sending to the old MME a Context Request message including the group ID.

3. The method according to claim 2, wherein, the step c further includes:
   c3. the old MME utilizing the group ID to query for information of the first MTC device and the at least one second MTC device included in the group; and
   c4. the old MME providing the context of the at least one second MTC device to the new MME according to information of the at least one second MTC device.

4. The method according to claim 1, further including: after obtaining the context of the at least one second MTC device from the old MME, the new MME sending to the old MME a Context Acknowledge including the group ID to acknowledge the receipt of the context of the first MTC device and of the context of the at least one second MTC device.

5. The method according to claim 1, wherein, the communication network further includes a Serving GateWay (SGW) which serves the group of MTC devices before TAU, and the method further includes:
   the old MME sending to the SGW a Delete Session Request including the group ID, and after the SGW queries for information of the first MTC device and the at least one second MTC device included in the group, sending to the old MME a Delete Session Response including the group ID.

6. The method according to claim 1, wherein, when an MTC device is attached to the communication network, the old MME device adds, when creating a context for the MTC device, the group ID in the context.

7. A Mobility Management Entity (MME) of performing mobility management for a group of Machine-Type Communication (MTC) devices in a communication network, the group comprising a first MTC device and at least one second MTC device that have the same group ID and location information, the communication network comprising an old MME for providing mobility management to the group of MTC devices before TAU, the MME comprising a processor configured to execute:
- a context of the first MTC device obtaining module configured to, after receiving a TAU request about the first MTC device, obtain a context of the first MTC device from the old MME;
- a checking module configured to check the context of the first MTC device to find the group ID of the group;
- a context of the second MTC device obtaining module configured to utilize the group ID to obtain from the old MME a context of the at least one second MTC device; and
- a suspending module configured to, when receiving other TAU request with the same location information sent by the at least one second MTC device, suspend the handling of the other TAU request.

8. The MME according to claim 7, wherein, the context of the second MTC device obtaining module further includes:
- a query module configured to, if the group ID is included in the context of the first MTC device, utilizing the group ID to query for information of the first MTC device and the at least one second MTC device included in the group;
- a context request module configured to send to the old MME a Context Request message including the group ID; and
- a context reception module configured to receive the context of the at least one second MTC device provided by the old MME.

9. The MME according to claim 7, wherein the processor is further configured to execute: a context acknowledge module configured to, after obtaining the context of the at least one second MTC device from the old MME, send to the old MME a Context Acknowledge including the group ID to acknowledge the receipt of the context of the first MTC device and of the context of the at least one second MTC device.

10. An MTC Mobility Group Server for a communication network, the server including storage device and query device,
- the storage device storing, for a group including a plurality of MTC devices, an association between a group ID of the group and identities of the MTC devices in the group, wherein when an MTC device in the group is attached to the communication network, the identity of the MTC device is added into the group, and when an MTC device in the group is detached from the communication network, the identity of the MTC device is removed from the group;
- the server also including query device, which is configured to, when the server receives Get Group Member Information Request, provide the identities of the MTC devices included in the group.

* * * * *